US007043837B2

(12) United States Patent
Yamamoto et al.

(10) Patent No.: US 7,043,837 B2
(45) Date of Patent: May 16, 2006

(54) METHOD OF MANUFACTURE OF INKJET PRINTER HEAD

(75) Inventors: Ryoichi Yamamoto, Kanagawa (JP); Masao Mitani, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 217 days.

(21) Appl. No.: 10/277,837

(22) Filed: Oct. 23, 2002

(65) Prior Publication Data

US 2003/0038857 A1 Feb. 27, 2003

Related U.S. Application Data

(62) Division of application No. 09/875,296, filed on Jun. 7, 2001, now Pat. No. 6,962,407.

(30) Foreign Application Priority Data

Jun. 7, 2000 (JP) ............................ 2000-170650

(51) Int. Cl.
*B23P 17/00* (2006.01)
*B41J 2/165* (2006.01)

(52) U.S. Cl. .......................... 29/890.1; 29/424; 347/29

(58) Field of Classification Search ............... 29/890.1, 29/418, 423, 424; 327/55, 112; 347/29, 347/55, 112

See application file for complete search history.

(56) References Cited

U.S. PATENT DOCUMENTS 3,747,120 A 7/1973 Stemme
4,926,197 A * 5/1990 Childers et al. .............. 347/63
5,335,002 A 8/1994 Nagahata et al.
5,336,930 A 8/1994 Quach (Continued)

FOREIGN PATENT DOCUMENTS

JP 48-9622 2/1973
JP 54-51837 4/1979
JP 402158156 6/1990
JP 05-147210 * 6/1993
JP 6-71888 3/1994

(Continued)

*Primary Examiner*—Eric Compton
(74) *Attorney, Agent, or Firm*—Whitham, Curtis & Christofferson, P.C.

(57) ABSTRACT

The inkjet recording head includes a head body and a metallic film is provided at least on a part of at least one side of the head body. The head body includes a plurality of orifices, an ink ejection unit arranged so as to correspond to each of the orifices, an independent ink flow path for supplying ink to each of the orifices and a common ink flow path for supplying ink to the independent ink flow path. The manufacturing method of the inkjet recording head forms the metallic film at least on a part of an opposite surface of a substrate to the individual ink flow paths, before adhering the orifice plate in which the orifices are formed. The inkjet printer uses the inkjet recording head.

4 Claims, 7 Drawing Sheets

U.S. PATENT DOCUMENTS

| | | | | |
|---|---|---|---|---|
| 5,666,140 | A | 9/1997 | Mitani et al. | |
| 5,697,144 | A | 12/1997 | Mitani et al. | |
| 5,831,648 | A | 11/1998 | Mitani et al. | |
| 5,831,651 | A * | 11/1998 | Usui et al. | 347/70 |
| 6,074,040 | A * | 6/2000 | Usui et al. | 347/45 |
| 6,197,619 | B1 * | 3/2001 | Gaynes et al. | 438/124 |
| 6,257,703 | B1 | 7/2001 | Hirosawa et al. | |
| 6,273,555 | B1 * | 8/2001 | Hess | 347/63 |
| 6,328,427 | B1 * | 12/2001 | Watanabe et al. | 347/58 |
| 6,595,622 | B1 * | 7/2003 | Yamamoto | 347/44 |
| 6,695,442 | B1 * | 2/2004 | Kitahara | 347/92 |

FOREIGN PATENT DOCUMENTS

| | | | |
|---|---|---|---|
| JP | 6-297714 | | 10/1994 |
| JP | 7-227967 | | 8/1995 |
| JP | 8-20110 | | 1/1996 |
| JP | 8-207291 | | 8/1996 |
| JP | 11-078010 | * | 3/1999 |
| JP | 2000-296617 | * | 10/2000 |

* cited by examiner

METHOD OF MANUFACTURE OF INKJET PRINTER HEAD

This application is a Division of U.S. patent application Ser. No. 09/875,296, filed Jun. 7, 2001, now U.S. Pat. No. 6,962,407.

BACKGROUND OF THE INVENTION

The present invention belongs to a technical field of an inkjet printer that ejects ink droplets to record an image. More particularly, the present invention relates to an inkjet recording head, a method of manufacturing the same and an inkjet printer using the inkjet recording head, whose yield of production can be greatly improved.

An inkjet recording apparatus is disclosed in Japanese Patent Laid-Open No. Sho48(1973)-9622 gazette and No. Sho54(1979)-51837 gazette, in which a portion of ink is rapidly evaporated by a pulse heating and ink droplets are ejected from orifices by expansion force.

In the inkjet recording apparatus, the simplest method of the pulse heating is the one in which pulse energizing is applied to a thin film heater.

Forming a drive LSI to perform the pulse conduction and the thin film heater on the same silicon (Si) substrate can realize a small and high thermal efficient inkjet recording head that has never existed before. Such an inkjet recording head is disclosed by one of the present inventors in Japanese Patent Laid-Open No. Hei6(1994)-71888 gazette, No. Hei6 (1994)-297714, No. Hei7(1995)-227967, No. Hei8(1996)-20110 and No. Hei8(1996)-207291.

Using this technology can allow the orifices for ink ejection to be integrated and formed two-dimensionally in a large scale and in high-density. For example, a full-color printer for A4 paper having a recording capability of 30 ppm to 60 ppm (currently, several ppm)(ppm represents pages per minute).

FIG. 8 shows a schematic sectional view of one example of such a conventional inkjet recording head.

An inkjet recording head (hereinafter, referred to as a recording head) 150 shown in FIG. 8 has drive LSIs 14 directly formed on the surface (a side where nozzles are formed, to be described later) of an Si substrate 12. In addition, heat generating resistors (not shown) driven by the drive LSIs 14, partition walls 15 that form ink flow paths for supplying ink to nozzles and the like are also formed on the surface of the Si substrate.

Moreover, ink grooves 16 for supplying ink to the ink flow paths are formed on the Si substrate 12 in an extended manner in an array direction (a perpendicular direction to the paper surface of FIG. 8) of the nozzles so as to dig into the surface of the Si substrate 12. Further, ink supply bore holes 18 for supplying ink to the ink groove 16 are arrayed at specified intervals in the extending direction of the ink groove 16 and bored so as to communicate the back surface of the Si substrate 12 and the ink groove 16.

Orifices 20 functioning as nozzles for ink ejection are formed on an orifice plate 22 laminated on the Si substrate 12 (partition walls 15). The nozzles, each of which is circular in section, are arrayed in the perpendicular direction to the surface of this paper, for example, in a pitch of about 70 μm (360 npi=nozzles per inch). As shown in FIG. 8, the recording head of 720 npi can be realized by including two of such nozzle arrays.

Ink is led from the ink supply bore hole 18 formed on the Si substrate 12 into the ink groove 16 on the upper surface of the substrate. Ink, then, flows through the ink flow path formed by the partition wall 15, is distributed to the orifice arrays (nozzle arrays) formed on the both sides (perpendicular direction to the nozzle array) of the ink groove 16 in 360 npi, and is ejected.

Note that reference numeral 24 in the drawing denotes a frame for supporting the Si substrate 12. Ink grooves 26 are formed in the frame 24 for supplying ink, which is supplied from ink tanks via specified routes formed on the inkjet recording head is supplied to the ink supply bore holes 18 thorough the ink grooves 26. Hereinafter, in FIG. 8, a component except for the frame 24 shall be referred to as a chip (that is, a head body) 152.

The chip 152 of the recording head 150 can be fabricated by a thin film forming process used in a semiconductor manufacturing or the like. Therefore, the large number of chips 152 can be formed on one piece of an Si wafer as shown in FIG. 9A.

As shown in FIG. 9B, a nozzle array 28Y, a nozzle array 28C, a nozzle array 28M and nozzle arrays 28B (two arrays) are formed on one chip 152, which are made by arraying the orifices 20 (nozzles) that eject yellow ink (Y), cyan ink (C), magenta ink (M) and black ink (B) respectively (the foregoing FIG. 8 shows a sectional view of FIG. 9B at line a—a).

Therefore, four ink supply bore holes 18 (18Y, 18C, 18M and 18B) are formed on the chip 152, that is, on the back side of the Si substrate, each of which supplies ink to each ink groove 16 of each nozzle array 28 in an example shown in the drawing.

As described above, since the nozzles are arrayed in 360 npi, one scanning can form a full color image of about 9 mm width by allowing one nozzle array 28 to have 128 nozzles, for example.

Moreover, printing speed can be greatly improved when a long head (a line head) as shown in FIG. 10 is fabricated. For example, a line head having nozzle arrays exceeding 190 mm can produce a color image of size A4 in one scanning.

As described above, the head 150 is small and has high thermal efficiency and superior capability. However, on the contrary, there is a problem that the strength of the chip 152 is low and production yield thereof is reduced.

As described above, the ink grooves 16 and the ink supply bore holes 18 are formed in the chip 152. The ink groove 16 is formed by digging into the surface of the Si substrate 12 (Si wafer) so as to extend over the entire length of the nozzle array 28. Moreover, in the ink groove 16, the depth and the width of a certain extent are required to reduce a flow path resistance in order to eject ink in good condition.

In addition, the ink supply bore holes 18 are made by boring to penetrate the Si substrate 12. Similarly to the ink grooves 16, the diameter and the number thereof to a certain extent are required to reduce the flow path resistance.

Due to the ink grooves 16 and the like, the strength of the Si substrate 12, which is not very high originally, further reduces. Particularly, the strength reduction greatly emerges in the line head shown in FIG. 10 because of its long size.

As a result, heat, mechanical stress and the like cause a crack in the Si substrate 12 and the chip 152. Such heat, mechanical stress and the like occur on occasions for: adhesion step of the orifice plate 22; cutting off the chip 152 from the Si wafer; handling the chip 152 after cutting off; fixing and wire connecting the chip 152 onto the frame 24 (when the chip 152 is mounted on the frame 24) and the like. In the extreme case, the chip 152 is broken, and such a crack and a break are causes for the yield reduction of the recording head 150.

SUMMARY OF THE INVENTION

The object of the present invention is to solve the problems of the foregoing conventional art. Particularly, the first object of the present invention is to provide an inkjet recording head where the strength of a head body such as the chip and the like is high and reduction of the yield caused by damage during manufacturing can be prevented to a great extent. The inkjet recording head of the present invention may be various inkjet recording heads including an inkjet recording head which is used in a top shooter type thermal inkjet printer and uses a chip made by forming the drive LSIs, the heat generating resistors and the like on the Si substrate by a thin film forming process, as described above.

The second object of the present invention is to provide a method of manufacturing the inkjet recording head.

The third object of the present invention is to provide an inkjet printer using the inkjet recording head.

In order to attain the first object described above, the first aspect of the present invention provides an inkjet recording head, comprising: a head body including: a plurality of orifices; an ink ejection unit arranged so as to correspond to each of the plurality of orifices; an individual ink flow path for supplying ink to each of the plurality of orifices; and a common ink flow path for supplying ink to the individual ink flow path; and a metallic film at least on a part of at least one side of the head body.

Preferably, the metallic film contains as a main component at least one selected from the group comprising chrome, nickel, zirconium, niobium, molybdenum, hafnium, tantalum and tungsten.

Preferably, the plurality of orifices are formed on one side of the head body, the ink ejection unit includes an ink heating unit, an ink supply bore hole for supplying ink to the common ink flow path is bored on a side opposite to an orifice forming surface of the head body, and the metallic film is provided on the side opposite to the orifice forming surface of the head body.

Preferably, film thickness of the metallic film ranges from 0.1 μm to 0.9 μm.

In order to attain the second object described above, the second aspect of the present invention provides a method of manufacturing an inkjet recording head, comprising: at least one working step of a step of boring holes and a step of forming grooves in a substrate constituting a portion of individual ink flow paths for supplying ink to each of orifices; a step of adhering an orifice plate in which the orifices are formed, which is performed after the at least one working step; and a step of forming a metallic film at least on a part of an opposite surface of the substrate to the individual ink flow paths, before the step of adhering the orifice plate.

Preferably, the metallic film contains as a main component at least one selected from the group comprising chrome, nickel, zirconium, niobium, molybdenum, hafnium, tantalum and tungsten.

Preferably, the plurality of orifices are formed on one side of the head body, the holes for supplying ink are bored on a side opposite to an orifice forming surface of the head body, and the metallic film is provided on the side opposite to the orifice forming surface of the head body.

Preferably, film thickness of the metallic film ranges from 0.1 μm to 0.9 μm.

In order to attain the third object described above, the third aspect of the present invention provides an inkjet printer using an inkjet recording head comprising: a head body including: a plurality of orifices; an ink ejection unit arranged so as to correspond to each of the plurality of orifices; an individual ink flow path for supplying ink to each of the plurality of orifices; and a common ink flow path for supplying ink to the individual ink flow path; and a metallic film at least on a part of at least one side of the head body.

Preferably, the metallic film contains as a main component at least one selected from the group comprising chrome, nickel, zirconium, niobium, molybdenum, hafnium, tantalum and tungsten.

Preferably, the plurality of orifices are formed on one side of the head body, the ink ejection unit includes an ink heating unit, an ink supply bore hole for supplying ink to the common ink flow path is bored on a side opposite to an orifice forming surface of the head body, and the metallic film is provided on the side opposite to the orifice forming surface of the head body.

Preferably, film thickness of the metallic film ranges from 0.1 μm to 0.9 μm.

DETAILED DESCRIPTION OF THE INVENTION

Hereinafter, description will be made in detail for an inkjet recording head of the present invention, a method of manufacturing the inkjet recording head, and an inkjet printer using the inkjet recording head, in accordance with preferred embodiments shown by the drawings attached.

Figure 1:
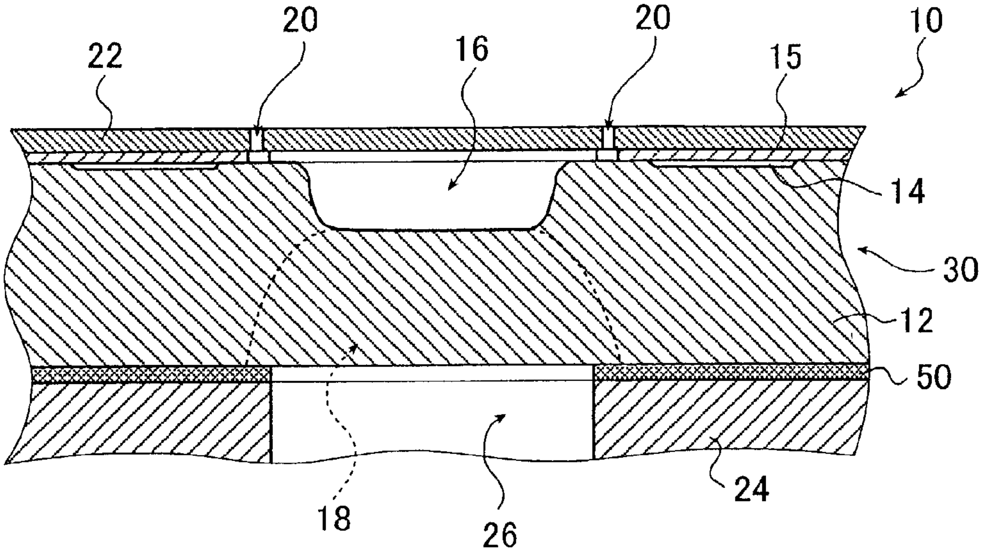
FIG. 1 is a schematic sectional view of one embodiment of an inkjet recording head of the present invention.

FIG. 1 shows a schematic sectional view of a portion of the inkjet recording head of the present invention.

Note that the major part of an inkjet recording head (hereinafter, referred to as a recording head) 10 has a constitution similar to the foregoing recording head 150 shown in FIG. 8. The same reference numerals are given to the same members, and the following description is mainly focused on the different portions and is made in more details.

Figure 9A:
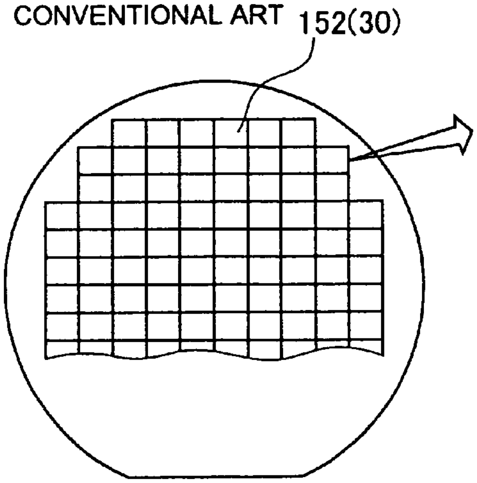
FIG. 9A CONVENTIONAL ART
FIGS. 9A, 9B and 9C are conceptual views for explaining the inkjet recording head of the present invention and the conventional inkjet recording head.
Figure 9B:
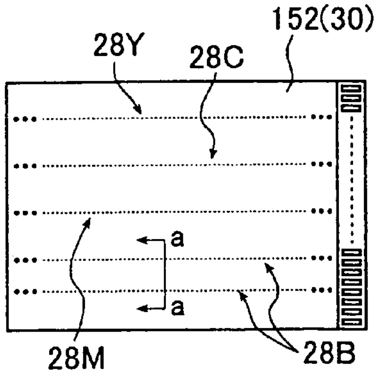
FIG. 9B CONVENTIONAL ART
Figure 9C:
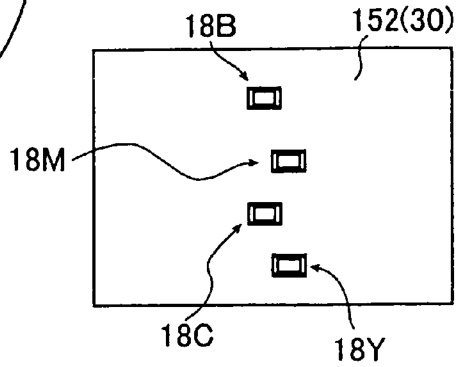
FIG. 9C CONVENTIONAL ART

Note that the inkjet recording head of the present invention may be the one having five nozzle arrays 28 as shown in FIG. 9B, or may be the one having nozzle arrays 28 of one to four arrays or six arrays or more. In addition, color of ink ejected from each nozzle and a combination thereof are optional.

Figure 10:
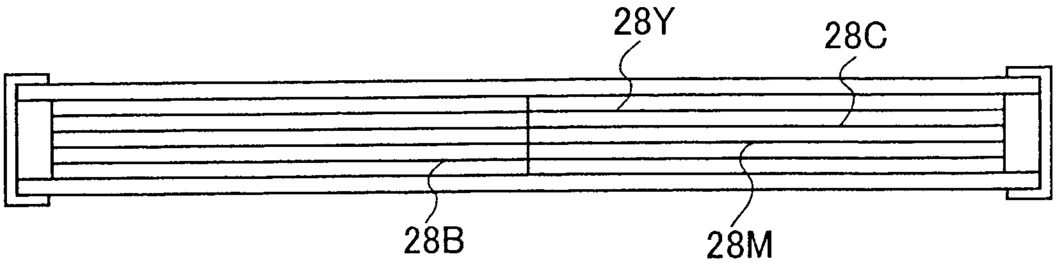
FIG. 10 is a conceptual view for explaining another embodiment of the inkjet recording head of the present invention and the conventional inkjet recording head.

Moreover, the inkjet recording head of the present invention may be a small inkjet recording head of a carriage type, where the head scans a recording paper in the direction perpendicular to a carrying direction of the recording paper. Alternatively, the inkjet recording head may be the line head as shown in FIG. 10, where the nozzle arrays are arranged so as to extend over the entire length of one side of the recording paper (or length exceeding one side of the recording paper).

Further, the embodiment shown in the drawing exemplifies a so-called top shooter type inkjet recording head that ejects ink from the surface of the head body as an example. However, the present invention is not limited to this, but may be a so-called side shooter type inkjet recording head that ejects ink from an end surface of the head body, for example, as disclosed in Japanese Patent Laid-Open No. Hei11(1999)-263014 gazette and the like.

Similarly to the recording head 150 described above, the recording head 10 exemplified in the drawing has drive LSIs 14 and the like formed on the surface (the surface where the orifices 20 are formed) of an Si substrate 12 of a chip 30 (the head body in the present invention). Moreover, partition walls 15 (described later) that form ink flow paths to nozzles are formed by covering the drive LSIs 14. Further, an orifice plate 22 is laminated on the Si substrate 12 (on the partition walls 15), the orifice plate 22 having the orifices 20 that are the nozzles.

Note that various widely known materials can be used as a forming material of the orifice plate 22 and the partition walls 15. For example, polyimide and the like are exemplified. Moreover, similarly to the recording head 150 described above, ink grooves 16 for supplying ink to the ink flow paths formed by the partition walls 15 and the like are formed on the Si substrate 12 in an extended manner in the entire area in the array direction of the orifices 20 so as to dig into the surface of the Si substrate 12. Further, ink supply bore holes 18 for supplying ink to the ink groove 16 are bored to penetrate the Si substrate 12 at specified intervals in the extension direction of the ink groove 16 so as to communicate the back surface of the Si substrate 12 and the ink groove 16.

Figure 8:
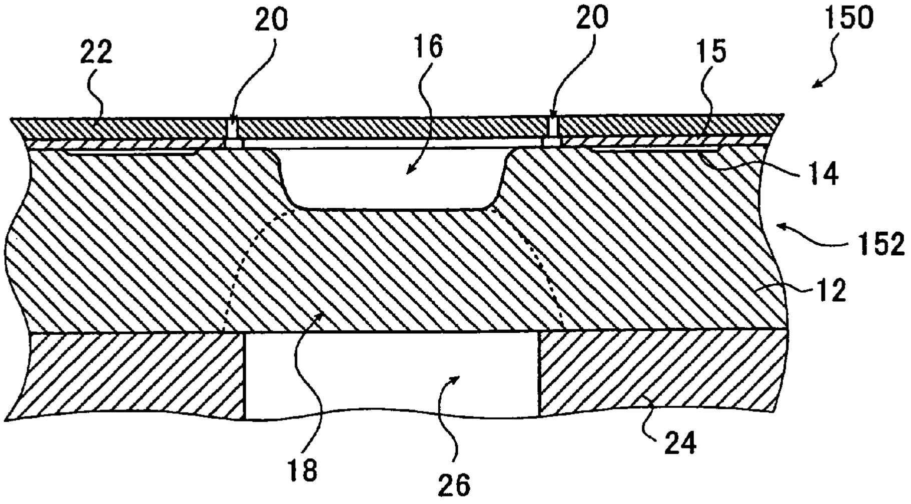
FIG. 8 PRIOR ART
FIG. 8 is a schematic sectional view of one embodiment of a conventional inkjet recording head.

Similarly to the embodiment shown in FIG. 8, such a chip 30 is supported and fixed by the frame 24.

In the recording head 10, ink supplied via a specified route from an ink tank loaded is supplied from an ink groove 26 in the frame 24 to the ink supply bore holes 18 of the chip 30, and led into the ink groove 16 formed on the surface of the Si substrate 12.

Figure 2A:
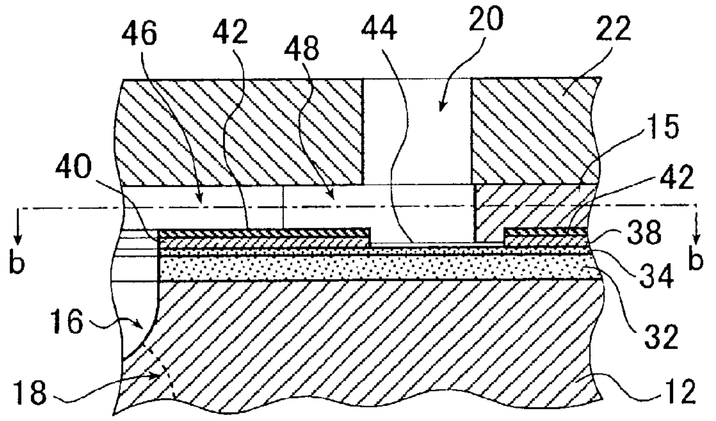
FIG. 2A is a partially enlarged view of FIG. 1.
Figure 2B:
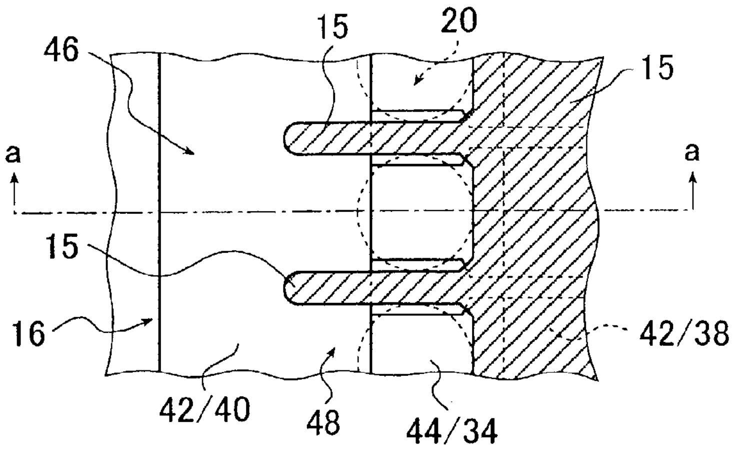
FIG. 2B is a schematic sectional view thereof at line b—b of FIG. 2A.

FIG. 2A and FIG. 2B show an enlarged view of the vicinity of the orifice 20 of FIG. 1 and a b—b line sectional view thereof respectively. Therefore, FIG. 2A is an a–a line sectional view of FIG. 2B (FIG. 1 is the same sectional view).

As shown in FIG. 2A, a silicon dioxide ($SiO_2$) layer 32 is simultaneously formed on the surface of the Si substrate 12 when the drive LSIs 14 are formed by an LSI forming process. The $SiO_2$ layer 32 functions as a heat insulation layer.

A thin film resistor 34 is formed on the $SiO_2$ layer 32. Further, on the thin film resistor 34 except for an area corresponding to the orifice 20, an independent conductive thin film 38 corresponding to each nozzle is formed on the side of the drive LSI 14 relative to the orifice 20, and a common conductive thin film 40 common to all of the orifices 20 on the side opposite to the drive LSI 14, thus constituting the heat generating resistor corresponding to each orifice 20.

Moreover, a gold plating layer 42 is formed by covering the both conductive thin films.

In the exemplified drawing, as a preferred embodiment, the thin film resistor 34 is formed of a ternary alloy of tantalum-silicon-oxygen, and the independent conductive thin film 38 and the common conductive thin film 40 are formed of nickel (Ni).

Moreover, the thin film resistor 34 (the ternary alloy) is heated and oxidized in an oxidation atmosphere to form an insulation film 44 on an area which is not covered with the conductive thin film, that is, the area corresponding to the orifice 20.

The insulation film 44 has an excellent strength and corrosion resistance to ink. Therefore, the recording head 10 in the embodiment in the drawing does not need a protective layer aiming at anti-cavitation and corrosion resistance, which are included in a normal thermal inkjet recording head. As a result, reduction of input energy and the like can be made, and a small and high thermal efficient inkjet recording head can be realized.

In addition, with this constitution, the conductive thin film is in contact with ink. Even when the recording head 10 does not have the gold plating layer 42, good corrosion resistance to ink can be secured by forming the conductive thin film of Ni.

Further, in the embodiment shown in the drawing, the recording head 10 has the gold plating layer 42 as a preferred aspect. The gold plating layer 42 is the one introduced to prevent a bonding pad surface of the drive LSI 14 from oxidizing on the occasion of the oxidation processing of the ternary alloy performed by heating. Because of the gold plating layer 42, a bonding pad forming step is greatly simplified. Further, a lot of preferred effects such as reduction of wiring resistance in the Ni conductive thin film and improved reliability in mounting the recording head can be obtained.

Note that the recording head of the present invention is not limited to this. The recording head may be a normal recording head where the thin film resistor made of hafnium (Hf)-boron (B) or tantalum (Ta)-aluminum (Al) or the conductive thin film made of aluminum (Al) is used, and has a protective layer formed by aiming at the foregoing functions.

The recording head of the present invention is not limited to the recording head (a thermal inkjet recording head) in which ink is ejected by heating as shown in the embodiment of the drawing. The recording head may be the one in which ink is ejected by a diaphragm utilizing vibration of a piezoelectric element or the like.

Moreover, the recording head of the present invention may be a so-called electrostatic type recording head, in which electrostatic force is generated between a vibration plate and an opposed electrode, the vibration plate is displaced by the electrostatic force, and ink is pressured by the resilience force of the vibration plate to be ejected.

In the electrostatic type recording head, the vibration plate is normally formed on the Si substrate by using the thin film forming process, and an ejection chamber (independent ink flow path) is formed in a closed space having the vibration plate. In the electrostatic type recording head, a voltage is applied to electrify the electrode and the vibration plate in different potentials, and the both are allowed to be closer to each other by the electrostatic force. Thus, a volume of the ejection chamber is expanded to lead ink from a cavity (a common ink flow path) into the ejection chamber. Subsequently, power is turned off to restore the vibration plate to the original position, which pressures the ejection chamber. Then, ink is ejected by the pressured force. Alternatively, ink is ejected from or led into the ejection chamber by vibration energy of the vibration plate caused by the electrostatic force.

The electrostatic type recording head is described in detail, for example, in Japanese Patent Laid-Open No. Hei5(1993)-50601 gazette, No. Hei11(1999)-207956 gazette and the like.

Specifically, the recording head of the present invention is not limited to the thermal inkjet recording head, but may be an inkjet recording head where ink is ejected by the diaphragm using the piezoelectric element or the like, and may be an electrostatic inkjet recording head. The recording head may be the side shooter type or the top shooter type.

As shown in FIG. 1 and FIGS. 2A and 2B, the partition wall 15 forming the ink flow path has a portion, which is formed to the extreme vicinity of the orifice 20 and completely covers the surface opposite to the ink groove 16 relative to the orifice 20 and wall-shape portions, each of which extends to a position a little closer to the ink groove 16 than the orifice 20 so as to protrude from the former portion and separates a space corresponding to the orifice 20 (insulation thin film 44 area corresponding to the orifices).

Therefore, as described above, ink supplied to the ink groove 16 flows from a common ink flow path 46, where the partition wall 15 on the gold plating layer 42 is not formed, to an independent ink flow path 48 divided for each nozzle by the partition wall 15. Then, under drive of the drive LSI 14, the nucleate boiling occurred by pulse heating of each heat generating resistor makes the ink eject from the orifice 20 (nozzle) corresponding to the resistor in a pulse state.

Note that the recording head having such a constitution is described in detail in each of the following gazettes by one of the present inventors: Japanese Patent Laid-Open No. Hei6(1994)-71888; No. Hei6(1994)-297714; No. Hei7 (1995)-227967; No. Hei8(1996)-20110; No. Hei8(1996)-207291; No. Hei10(1998)-16242 and the like.

Herein, in the recording head 10 of the present invention, a metallic film 50 is formed on the back surface of the chip 30 (that is, the head body of the present invention in the embodiment of the drawing).

As described above, the strength of the Si substrate 12 reduces because it has the ink grooves 16, each of which extends in the entire area in the array direction of the nozzles, the ink supply bore holes 18, which penetrate the Si substrate 12 and communicate the back surface and the ink grooves 16, and the like.

Therefore, as in the foregoing, heat, mechanical stress and the like cause a crack and a break in the Si substrate 12. The heat, the mechanical stress and the like occur on occasions for: adhering of the orifice plate 22; cutting off the chip 30 from the Si wafer; handling the chip 30 after cutting off; mounting the chip 30 on the frame 24; and the like. Such a crack and a break are causes for reducing the production yield of the recording head.

On the other hand, the recording head 10 of the present invention has the metallic film 50 for reinforcing the chip 30 on the back surface of the Si substrate 12.

Therefore, the chip 30 is reinforced by toughness of the metallic film 50. The toughness can preferably prevent occurrence of the break and the crack of the chip 30, which are caused by the mechanical stress and the thermal stress in mounting the chip 30 on the frame 24 and the like. As a result, the production yield of the recording head can be improved. In addition, the metallic film 50 does not give much influence to a manufacturing process of the recording head 10.

Particularly, in the thermal inkjet recording head of the top shooter type exemplified in the drawing, the small and high efficient recording head can be realized. On the contrary, a working of grooves processing and a working of bore holes and the like in the Si substrate 12 are necessary to supply ink to the orifices 20. Thus, it is inevitable that the strength of the chip 30 (the head body) reduces, which easily causes the above-described problems. The present invention brings about extremely great effects.

In the present invention, a forming material of the metallic film 50 is not limited, and various metals and alloys can be used. Preferable examples include chrome (Cr), nickel (Ni), zirconium (Zr), niobium (Nb), molybdenum (Mo), hafnium (Hf), tantalum (Ta) and tungsten (W) from the viewpoint of corrosion resistance, functionality of toughness, quality and characteristic of the film and the like. Particularly among these metals, nickel (Ni) and tantalum (Ta) are preferable since they can well exhibit the above-described characteristics.

The metallic film 50 can be formed by a single metal of these metals, or can be formed by an alloy having one or more of these metals as a main component.

The metallic film 50 may have not only one layer but two or more layers. When the metallic film 50 of a plurality of layers is included, only a single metal, only an alloy or both of the single metal and the alloy may be used.

When the metallic film 50 of a plurality of layers is included, the layers may be formed of the same metal (alloy) by the different film forming methods. In the case where three or more layers are included, a plurality of the same layers may be included, for example, such as Ta layer-Ni layer-Ta layer.

Further, a resin film may be used in combination with the metallic film 50.

No limitation is given to the thickness of the metallic film 50.

However, the reinforcement effect for the chip 30 of the present invention cannot be favorably emerged if the film is too thin. On the other hand, if the film is too thick, the strength of the chip 30 is reduced by an internal stress included in the metallic film 50. The thick film is disadvantageous to manufacturing cost as well.

When taking the above-described factors in consideration, the film thickness of the metallic film 50 is preferably in the range of 0.1 μm to 0.9 μm (total thickness of all metallic layers in the case of a plurality of layers).

The effect of the present invention can certainly be emerged by setting the film thickness of the metallic film 50 at 0.1 μm or more, which can preferably reinforce the chip 30 and stably improve the production yield.

On the other hand, the bad influence by the internal stress of the metallic film 50 is normally negligible when the film thickness is 0.9 μm or less. In addition, by setting the film thickness of the metallic film 50 at 0.9 μm or less, reduction of the film forming time and saving of a target material are made, which leads to reduction of the forming cost of the metallic film 50. Moreover, peeling of the metallic film 50, clogging of a blade for cutting the Si wafer and the like are prevented when cutting off the chip 30 by dicing the Si wafer (described later). Thus, good cutting off is performed and the cutting cost can be reduced as well. Further, in manufacturing the recording head 10 (described later), it is effective that the metallic film 50 on the cutting position is removed by etching or the like in advance before dicing the Si wafer.

Specifically, by setting the film thickness of the metallic film 50 in the range of 0.1 μm to 0.9 μm, the reinforcement effect for the chip 30 can be favorably obtained and the manufacturing cost of the recording head 10 can be favorably reduced.

Particularly, by setting the film thickness of the metallic film 50 in the range of 0.4 μm to 0.6 μm, the reinforcement effect for the chip 30 is certainly emerged, and the bad influence by the internal stress of the metallic film 50 can be certainly eliminated even when the strength of the chip 30 is low. Accordingly, the excellent recording head 10 can be realized, the-recording head acquiring sufficient reinforcement effect, having an extremely high yield, and being very advantageous to the above-described manufacturing cost.

Note that, in the recording head 10 of the present invention, the area where the metallic film 50 is formed is not limited to on the back surface of the chip 30.

However, when the reinforcement effect, productivity, the cost and the like are taken in consideration, it is preferable in the top shooter type recording head that the metallic film 50 is formed only on the back surface of the chip 30 as in the embodiment of the drawing.

Further, formation of the metallic film 50 is not limited to on the entire surface of the forming area, but may be on a portion of the forming area. To acquire favorable reinforcement effect, it is preferable that the metallic film 50 is formed on the entire area at least on one side.

In the following, description will be made for a preferred embodiment of a manufacturing method of the present invention for manufacturing the recording head 10, by referring to the flowchart shown in FIG. 3.

Figure 3:
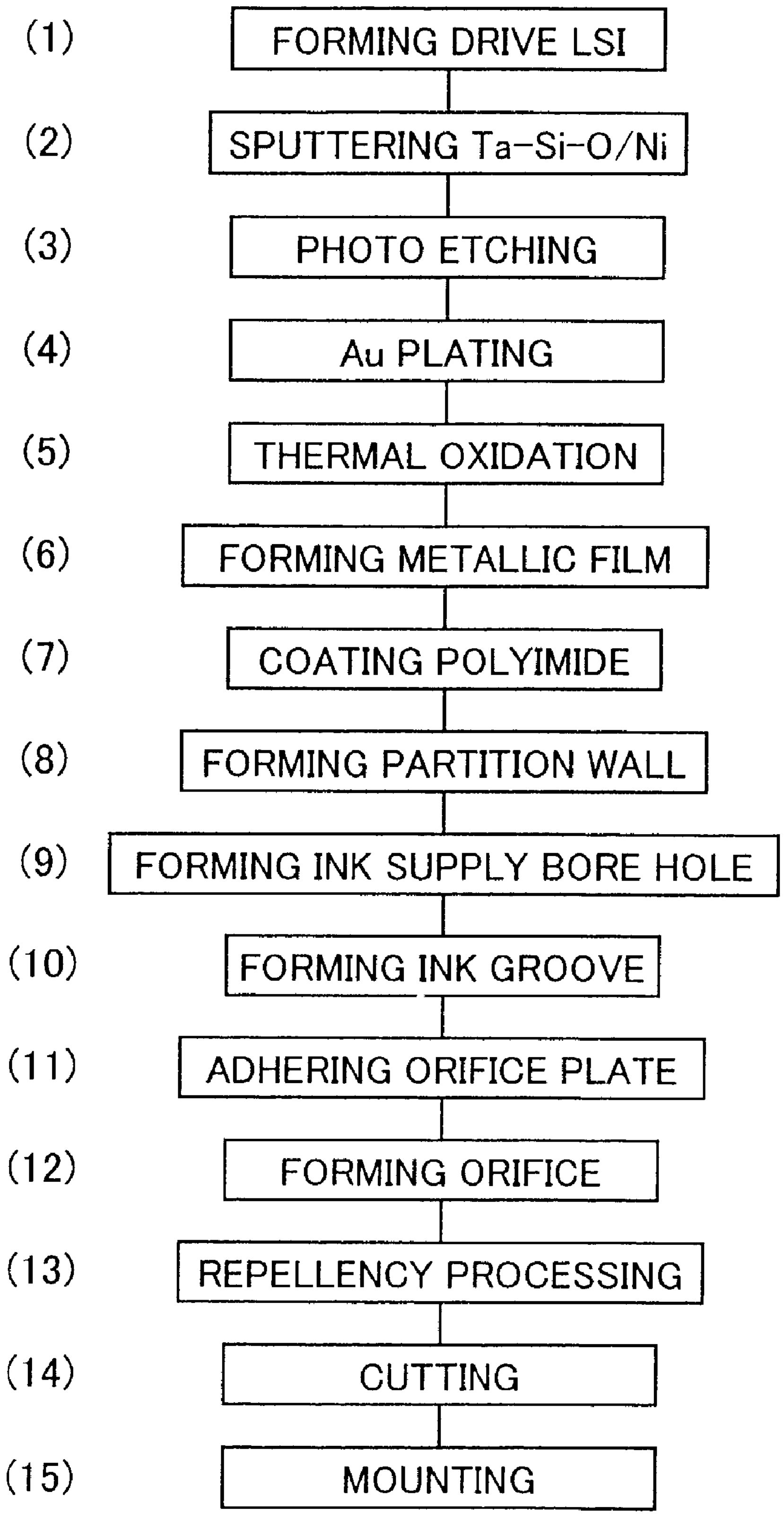
FIG. 3 is a flowchart for explaining one embodiment of a manufacturing method of the inkjet recording head of the present invention.

As shown in FIG. 3, firstly in the step (1), the drive LSIs 14 are formed on the Si substrate 12. In this step, the $SiO_2$ layer 32 acting as the heat insulation layer is formed as well.

Note that, in the manufacturing method, steps from (1) to (14) are performed in a state of an Si wafer as shown in FIG. 9A.

Next, in step (2), a ternary alloy film of Ta—Si—O is formed by a sputtering method, for example. An Ni film is further formed. In step (3), the heat generating resistors that in composed of the thin film resistor 34, the independent conductive thin film 38 and the common conductive thin film 40 are fabricated by photo etching.

Subsequently, the gold plating layer 42 is formed on the conductive thin film (Ni layer) in step (4). Then, in step (5), the ternary alloy is heated in the oxidation atmosphere to be oxidized, thus forming the insulation film 44.

When thermal oxidation is completed, the metallic film 50 is formed in step (6).

The forming method of the metallic film 50 is not particularly limited. The metallic film 50 may be formed by a widely known metallic film forming method such as various thin film forming technologies like sputtering and CVD (Chemical Vapor Deposition) and various thick film forming technologies like printing. Among these, the sputtering is preferably used from the viewpoint of easiness of film forming, the quality and characteristics of the formed metallic film 50 and the like.

After the metallic film 50 is formed, the forming material of the partition walls 15, polyimide, for example, is coated on the film by spin coating or the like subsequently in step (7). In step (8), the partition walls 15 are formed, for example, by photo dry etching.

Next, in step (9), the ink supply bore holes 18 are formed, and the ink grooves 16 are formed in step (10).

The both may be formed by a widely known method such as a method in which resist and dry or wet etching are used. From the viewpoint of working efficiency and the like, it is preferable that the ink supply bore holes 18 and the ink grooves 16 are formed by a combination of photoresist and processing by sandblasting. Regarding this point, the details are described in Japanese Paten Laid-Open No. Hei10 (1998)-202889 gazette by one of the present inventor.

After the ink supply bore holes 18 and the ink grooves 16 are formed, in step (11), the orifice plate 22 is adhered to the front surface. In step (12), the orifices 20 are formed, for example, by photo dry etching.

Thereafter, the surface of the orifice plate 22 is subjected to water-repellency treatment in step (13). This allows the ink tank to be at atmospheric pressure, and fast recording is enabled. No particular limitation is given to the method of the water-repellency treatment, and it can be performed by a widely known method.

Subsequently in step (14), the Si wafer is diced to cut off each chip 30 by a widely known method. Further in step (15), mounting of each chip, that is, fixing on a specified position of the frame 24, wire connecting and the like are performed.

Figure 4:
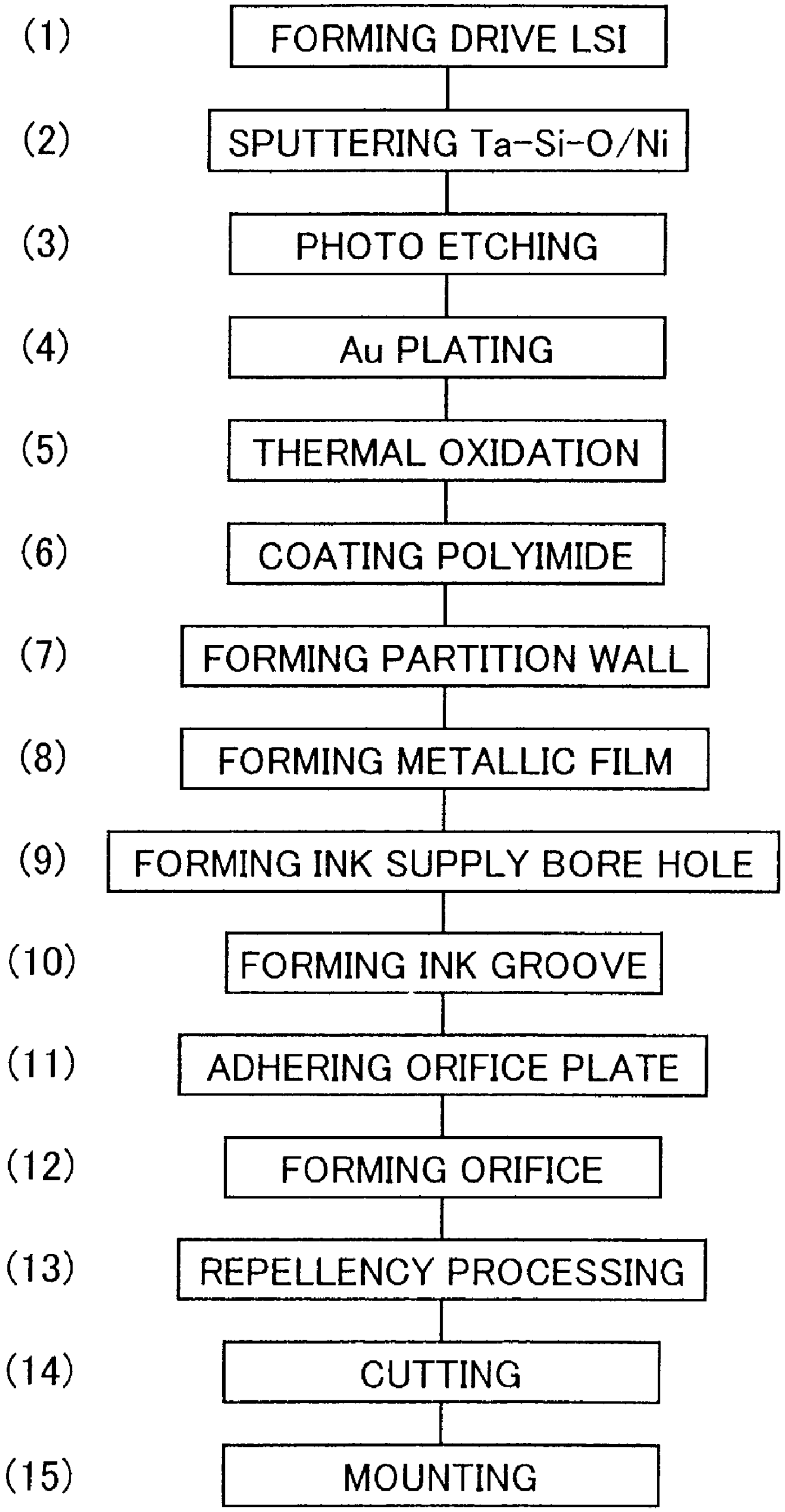
FIG. 4 is a flowchart for explaining another embodiment of a manufacturing method of the inkjet recording head of the present invention.

FIG. 4 shows another preferred embodiment of the manufacturing method of the present invention for manufacturing the recording head 10.

In the embodiment shown in FIG. 3, formation of the metallic film 50 is performed after the thermal oxidation in step (5). However, the manufacturing method shown in FIG. 4 is the one in which formation of the metallic film 50 is performed after the partition walls 15 are formed. Other part of the flowchart is similar to that of FIG. 3.

Specifically, in the manufacturing method shown in FIG. 4, the steps from fabrication of the drive LSIs 14 in step (1) to the thermal oxidation in step (5) are executed similarly to the manufacturing method of FIG. 3.

In the embodiment shown in FIG. 4, after the thermal oxidation in step (5), coating of the forming material (polyimide) of the partition walls 15 is performed in step (6), and then, the partition walls 15 are formed in step (7).

In this embodiment, the metallic film 50 is formed in step (8) after the partition walls 15 are formed.

The subsequent steps from formation of the ink supply bore holes in step (9) to mounting of the chip in step (15) are executed similarly to the manufacturing method of FIG. 3. Thus, the recording head 10 of the present invention is completed.

As it is clearly understood from the foregoing description, step (1) to step (15) in the manufacturing method of the recording head 10 of this kind can be executed by basically following the thin film forming process used for manufacturing a semiconductor device and the like.

The recording head 10 of the present invention basically can be manufactured by the method as described above. However, the manufacturing method of the present invention is not limited to the aforementioned two embodiments.

Herein, in the manufacturing of the recording head 10 of this kind, the step in which occurrences of the break and the like of the chip 30 are most concerned is the adhering step of the orifice plate 22. The break and the like are apt to occur as the head becomes longer. Additionally, the break of the chip in this step makes the processing in the Si wafer impossible after the step. This causes a defective of the Si wafer unit, which greatly reduces the production yield.

Therefore, in the manufacturing method of the present invention, the metallic film 50 is formed before adhesion of the orifice plate 22, that is, before step (11) referring to FIG. 3 and FIG. 4. This allows the foregoing break and the like of the chip 30 to be reduced more preferable, and the recording head 10 can be manufactured in better productivity.

On the other hand, formation of the metallic film 50 may be basically performed before the adhesion step of the orifice plate 22. However, if the metallic film 50 is formed before formation of the gold plating layer 42, unnecessary consumption of gold plating liquid and an additional step such as resist coating are required. This is disadvantageous to the manufacturing cost, the manufacturing efficiency and the like.

Accordingly, in the manufacturing method of the present invention, formation of the metallic layer 50 is preferably performed between any steps from the gold plating step to the adhesion step of the orifice plate 22. Among these, when easiness of film forming and the like are taken in consideration, the one between the thermal oxidation step and the polyimide coating step shown in FIG. 3 and the one between the partition wall forming step and the ink supply bore hole forming step are exemplified most preferably. Alternatively, it is preferable that the forming step of the metallic film 50 is provided next to the ink supply bore hole forming step.

Moreover, there is a case where a cutting device such as the blade is apt to be clogged during cutting when particular forming materials are used. In such a case, it is preferable that the metallic film 50 at the cutting position is removed in a width wider than the cutting width by about 50 μm to 200 μm, before the step where the Si wafer is diced to cut off each chip 30.

Note that various widely known methods such as a photo etching processing, a laser processing and a sandblasting processing can be used as a removing method of the metallic film 50.

Figure 5:
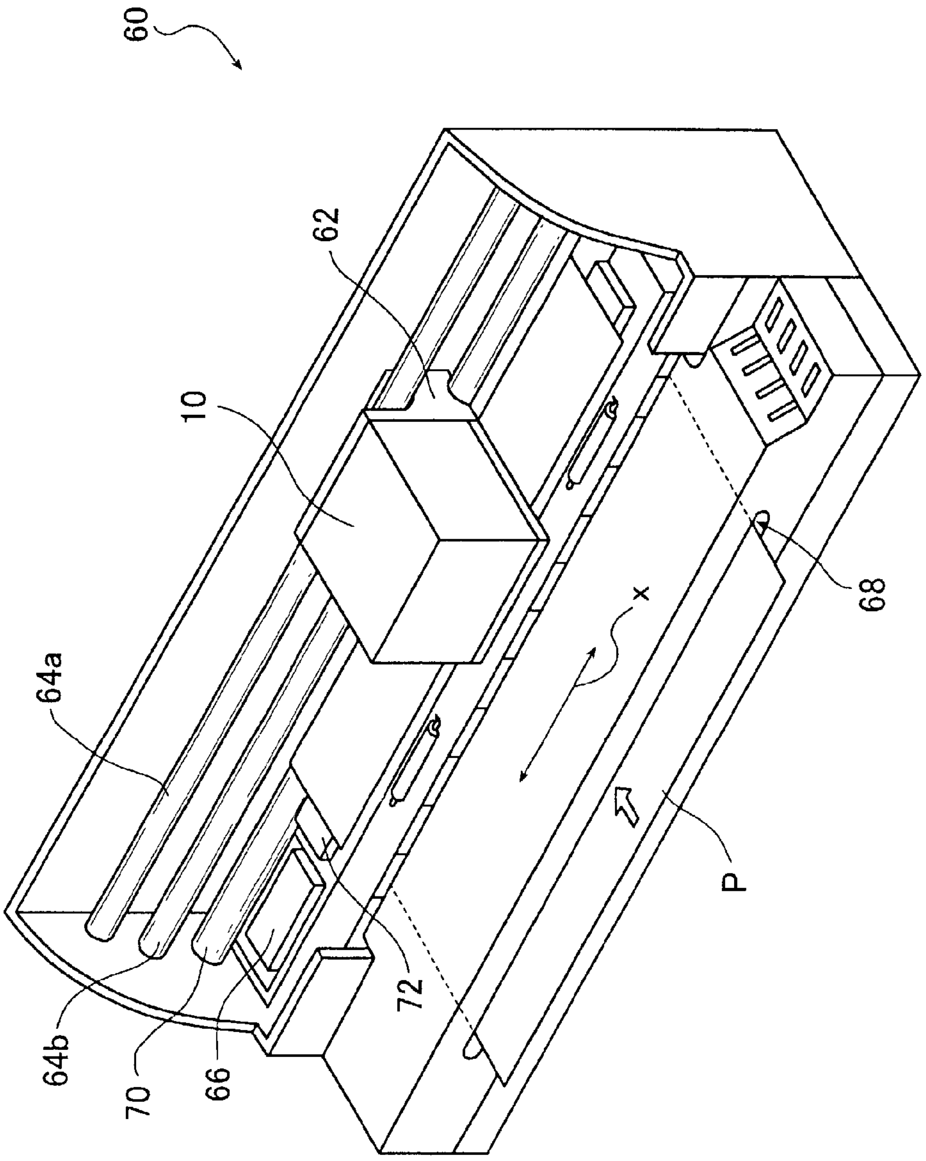
FIG. 5 is a schematic perspective view of one embodiment of an inkjet printer of the present invention.

FIG. 5 shows a schematic view of one embodiment of an inkjet printer of the present invention, where the recording head 10 of this kind of the present invention is used.

An inkjet printer 60 (hereinafter, referred to as a printer 60) shown in FIG. 5 is a so-called carriage type printer, in which a carriage allows the (inkjet) recording head to scan a recording paper P in one direction so that an image is recorded on the recording paper P. The printer 60 is basically a widely known inkjet printer except use of the recording head 10 of the present invention.

In the printer 60, the recording head 10 is the one having the chip 30 shown in FIG. 9B, for example, which is constituted by including a head unit which is made by mounting the chip 30 on the frame 24 and an ink tank. The recording head 10 is attached on a specified position of a carriage 62 by making the nozzle arrays 28 to be perpendicular to the scanning direction (the arrow x direction in the drawing) and also by facing the surface which is an ink ejection surface of the orifice plate 22 (that is, the surface of the chip 30) downward.

The carriage 62 is supported by two guide shafts 64*a* and 64*b* extending in the scanning direction so as to be freely movable in the scanning direction, and the carriage is moved by a widely known moving device (not shown) using a timing belt and the like, thus enabling the recording head 10 to perform scanning.

In addition, a maintenance unit 66, which cleans the surface of the orifice plate 22 of the recording head 10 by using a wiper or the like, is arranged under the vicinity of the ends of the guide shafts 64*a* and 64*b*.

On the other hand, the recording paper P is carried in the direction perpendicular to the scanning direction by a transport roller 70. In the embodiment shown in the drawing, the recording paper P is inserted from an insertion port 68 in front of the printer 60 as shown by an arrow. The recording paper P proceeds to the inner portion in the printer 60, and transported to the front portion so as to be folded back in the upper direction.

Further, on a specified recording position corresponding to a scanning position of the recording head 10, a guide 72 is arranged for supporting the area present at the recording position of the recording paper P from underneath.

As described above, transport of the recording paper P is intermittent, where the recording head 10 is allowed to scan the paper P by the carriage 62 when the paper P is stopped and the image is recorded on the area present at the recording position of the recording paper P. When the scanning ends, the paper P is transported by the specified amount and stopped. The image recording by the scanning, which is transported out by the recording head 10, is repeatedly performed, thus the image recording is performed on the entire surface of the recording paper P. For example, if the nozzle array 28 is at 360 npi having 128 nozzles as described above, the recording paper P is transported intermittently by 9 mm.

In addition, when the recording head 10 scans the maintenance unit 66, the surface of the orifice plate 22 is cleaned to prevent the orifices 20 (nozzles) from clogging and the like.

Figure 6A:
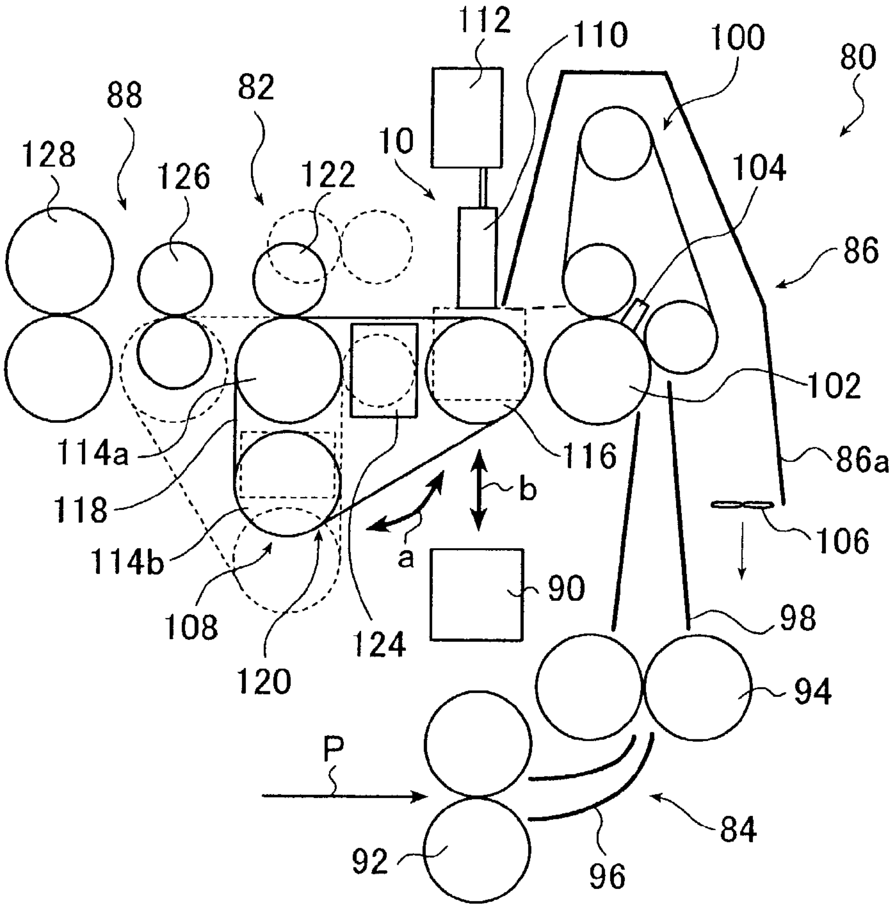
FIGS. 6A and 6B are conceptual views of another embodiment of the inkjet printer of the present invention.
Figure 6B:
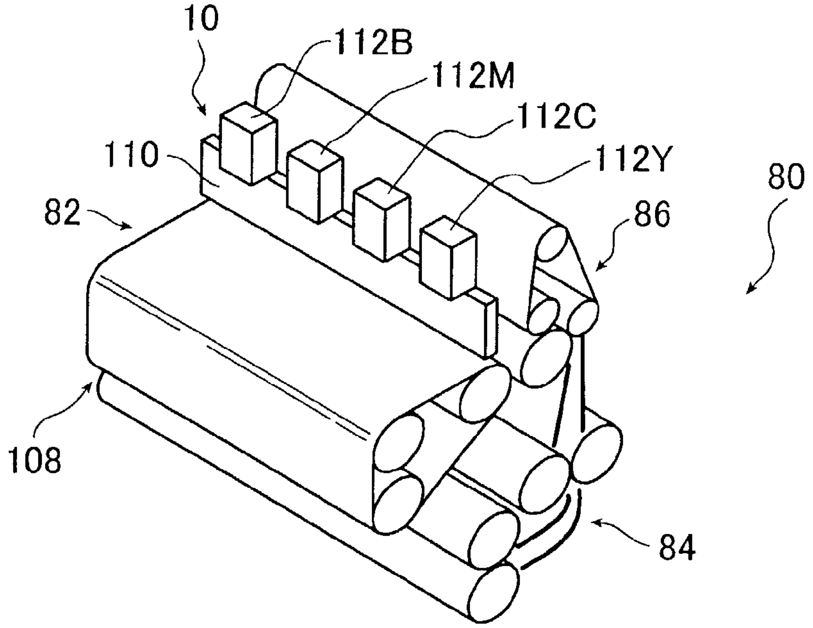

FIGS. 6A and 6B show another embodiment of the inkjet printer of the present invention, which uses the recording head 10 of the present invention. Note that, FIG. 6A is a conceptual view showing the constitution of the inkjet printer, and FIG. 6B is a conceptual view when the inkjet printer is viewed in an oblique direction.

An inkjet printer 80 (hereinafter, referred to as a printer 80) shown in FIGS. 6A and 6B is the one in which the line head shown in FIG. 10 is used as the recording head 10, the line head having the nozzle arrays 28 extending so as to exceed the recording paper P in a direction corresponding to the line head. The printer 80 is also basically a widely known inkjet printer except use of the recording head 10 of the present invention.

The printer shown in FIGS. 6A and 6B comprises: a recording portion 82 using the recording head 10 of the present invention; a paper feeding portion 84; a preheating portion 86; an ejection portion (omitted in FIG. 6B); and a maintenance unit 90.

The paper feeding portion 84 comprises: transport roller pairs 92 and 94; and guides 96 and 98. The recording paper P is laterally received and transported upward by the paper feeding portion 84, and is supplied to the preheating portion 86.

The preheating portion 86 comprises: a conveyer 100 that comprises three rollers and an endless belt; a pressure applying roller 102 to be pressed against the endless belt from the outside of the conveyer 100; a heater 104 pressed against the pressure applying roller 102 from the inside of the conveyer 100; and an exhaust fan 106 for exhausting of the preheating portion 86 (inside of the housing 86*a*).

The preheating portion 86 of this kind is the one for promoting drying of ink by heating the recording paper P prior to the image recording by the inkjet recording head. The recording paper P transported from the paper feeding portion 84 is heated by the heater 104 while sandwiched and transported by the conveyer 100 and the pressure applying roller 102, and transported to the recording portion 82.

The recording portion 82 comprises the recording head 10 of the present invention and a record transport unit 108.

The recording head 10 comprises: a head unit 110 that is made by mounting the chip 30 on the frame 24; and ink tanks

112 (112Y, 112C, 112M and 112B). The recording head 10 is arranged by making the nozzle arrays 28 extend perpendicular to the paper surface of FIG. 6A.

The record carrying unit 108 comprises: a conveyer 120 having rollers 114*a* and 114*b*, an adsorption roller 116 and a porous endless belt 118; a nip roller 122(omitted in FIG. 6B) pressed by the porous endless belt 118 (the roller 114*a*); and an adsorption box 124 arranged in the conveyer 120.

The recording head 10 is arranged by facing the orifices 20 (the surface of the chip 30) to the adsorption roller 116. The record transport unit 108 transports the recording paper P continuously at a specified speed in the direction perpendicular to the extending direction of the ink arrays 28 of the recording head 10. Therefore, the recording paper P supplied from the preheating portion 86 is scanned across the entire surface by the nozzle arrays 28 of the recording head 10 being the line head. Thus, the image is recorded.

The conveyer 120 is constituted of the porous endless belt 118, and further comprises the adsorption roller 116 and the adsorption box 124. Accordingly, the recording paper P is transported in the state of being adsorbed on the porous endless belt 118, and the image is recorded in the state where the recording paper P is adequately held on the specified position relative to the recording head 10.

The recording paper P on which the image is recorded is supplied to the ejection portion 88, carried by a carrying roller pair 126 and ejection rollers 128, and ejected to, for example, an ejection tray (not shown).

The maintenance unit 90 is the one for cleaning the recording head 10, which comprises a wiper 130 and a cap 132.

In the printer 80 shown in the embodiment in the drawing, the conveyer 120, nip roller 122, adsorption box 124 and the transport roller pair 126 are integrated into a unit. The unit is rotated by 90 degrees (an arrow a in the drawing) around a rotation axis of the roller 114*a* of the conveyer 120 by a widely known method, and constituted such that the conveyer 120 and the like integrated into the unit can be moved to the position shown by a dotted line in FIG. 6A.

Further, the maintenance unit 90 is positioned under the recording head 10, and constituted so as to ascend and descend (an arrow b in the drawing) by a widely known method.

When the recording head 10 is cleaned, the unit is firstly moved to the dotted line position.

Figure 7A:
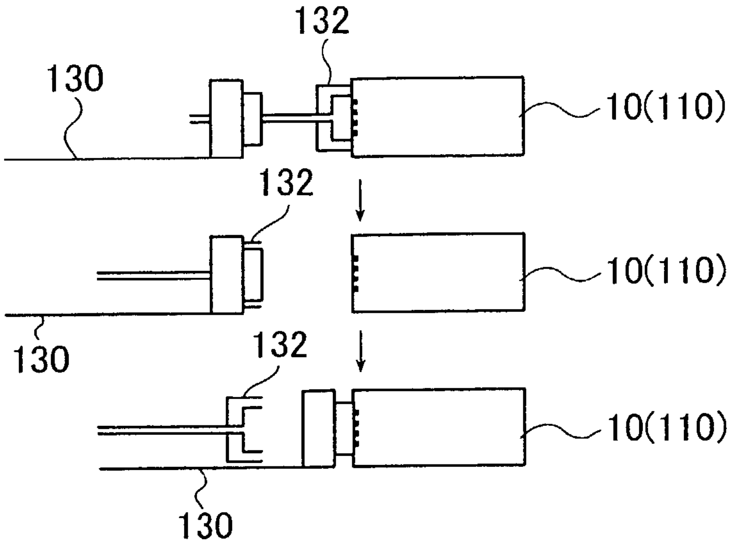
FIGS. 7A and 7B are conceptual views for explaining a maintenance unit of the inkjet printer shown in FIG. 5.
Figure 7B:
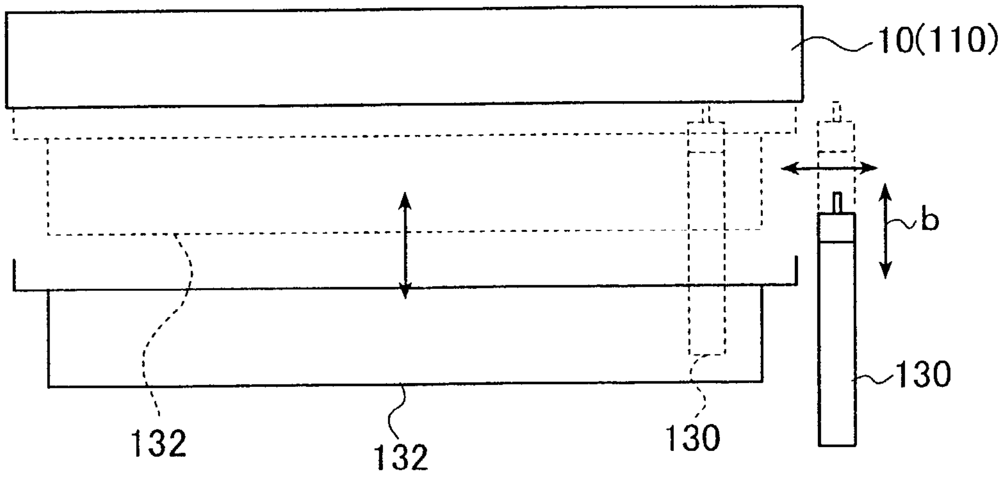

Consequently, as shown in FIGS. 7A and 7B, the maintenance unit 90 positioned at a stand-by position shown in FIG. 6A is ascended and the cap 132 is descended to be withdrawn. Thereafter, the wiper 130 is further ascended to abut on the recording head 10 (the surface of the chip 30, that is, the surface of the orifice plate 22), and the wiper 130 is moved in the nozzle array 28 direction to clean the recording head 10.

When cleaning is completed, the wiper 130 is moved back to the original position and descended, and the maintenance unit 90 is descended to move back to the standby position. Further, the unit is moved back to the position shown by a solid line.

The cap 132 hermetically covers the surface (the ink ejection surface) of the recording head 10 when recording is not performed, and prevents ink in the orifices 20 (the nozzles) from concentrating, drying and solidifying. In addition, a suction pump is connected to the cap 132, if necessary, which allows the inside of the orifices 20 to be a negative pressure in the state that the surface of the recording head 10 is hermetically covered. Thus, ink and the like clogged in the orifices 20 are removed.

Accordingly, when recording the image, the cap 132 is withdrawn from the position between the recording head 10 and the recording paper P.

Note that the inkjet printer of the present invention is not limited to the foregoing embodiments, but various kinds of widely known inkjet printers can be used. For example, the printer may comprise a feeder for automatically supplying the recording paper and the like.

Heretofore, description has been made in detail for the inkjet recording head, the manufacturing method of the inkjet recording head, and the inkjet printer of the present invention. The present invention is not limited to the foregoing embodiments. It is matter of course that various improvements and modifications may be made without departing from the spirit and the scope of the present invention.

As it has been described above in detail, according to the present invention, in various kinds of inkjet recording heads including a top shooter type thermal inkjet recording head, the strength of a head body of a chip and the like is secured. Thus, reduction of yield caused by a damage during manufacturing process such as mounting of a chip can be prevented to a grate extent.

What is claimed is:

1. A method of manufacturing an inkjet recording head body comprising:

- a working step of at least one of boring holes in a first surface of a substrate and forming grooves in a second surface opposite to the first surface of the substrate, the substrate constituting a portion of individual ink flow paths for supplying ink to each of a plurality of orifices;
- a step of adhering an orifice plate in which said orifices are formed to the second surface of said substrate, which is performed after said at least one working step; and
- a step of forming a metal film at least on a part of the first surface of said substrate before said step of adhering the orifice plate.

2. The method according to claim 1, wherein said metal film contains as a main component at least one metal selected from the group consisting of chrome, nickel, zirconium, niobium, molybdenum, hafnium, tantalum and tungsten.

3. The method according to claim 1, wherein film thickness of said metal film ranges for 0.1 μm to 0.9 μm.

4. The method according to claim 1, wherein said step of forming a metal film is performed prior to said working step of at least one of boring holes and forming grooves.

* * * * *